United States Patent
Zhang et al.

(10) Patent No.: US 10,441,941 B2
(45) Date of Patent: Oct. 15, 2019

(54) PREPARATION METHOD OF ALUMINA SUPPORTED CERIUM OXIDE POWDER MATERIAL

(71) Applicant: HOHAI UNIVERSITY, Nanjing, Jiangsu (CN)

(72) Inventors: Jianfeng Zhang, Jiangsu (CN); Gaiye Li, Jiangsu (CN); Huiyang Cao, Jiangsu (CN); Xin Zhang, Jiangsu (CN); Wenmin Guo, Jiangsu (CN); Yuping Wu, Jiangsu (CN)

(73) Assignee: HOHAI UNIVERSITY, Nanjing, Jiangsu (CN)

( * ) Notice: Subject to any disclaimer, the term of this patent is extended or adjusted under 35 U.S.C. 154(b) by 49 days.

(21) Appl. No.: 15/735,247

(22) PCT Filed: May 6, 2016

(86) PCT No.: PCT/CN2016/081282
§ 371 (c)(1),
(2) Date: Dec. 11, 2017

(87) PCT Pub. No.: WO2017/005042
PCT Pub. Date: Jan. 12, 2017

(65) Prior Publication Data
US 2018/0169622 A1    Jun. 21, 2018

(30) Foreign Application Priority Data

Jul. 3, 2015    (CN) .......................... 2015 1 03888993

(51) Int. Cl.
*B01J 23/10*    (2006.01)
*B01J 21/04*    (2006.01)
(Continued)

(52) U.S. Cl.
CPC ............ *B01J 23/10* (2013.01); *B01J 35/0006* (2013.01); *B01J 35/026* (2013.01);
(Continued)

(58) Field of Classification Search
CPC ........ B01J 23/10; B01J 21/04; B01J 35/0006; B01J 35/023; B01J 35/026; B01J 37/0223; B01J 37/0238
See application file for complete search history.

(56) References Cited

U.S. PATENT DOCUMENTS 5,804,513 A * 9/1998 Sakatani ............. C04B 35/1115
                                                                       106/3
6,602,439 B1 * 8/2003 Hampden-Smith ...... B01J 2/003
                                                                    252/79.1
(Continued)

FOREIGN PATENT DOCUMENTS

CN    101784695    7/2010
CN    105126808    12/2015

OTHER PUBLICATIONS

International Search Report filed in PCT/CN2016/081282 dated Aug. 12, 2016.

*Primary Examiner* — Cam N. Nguyen
(74) *Attorney, Agent, or Firm* — Rankin, Hill & Clark LLP

(57) ABSTRACT

The present invention discloses a preparation method of an alumina supported cerium oxide powder material. A cerium organometallic precursor is effectively decomposed into $CeO_2$ nanoparticles at 500-700° C. in an oxygen atmosphere condition by using a chemical vapor deposition method, and the $CeO_2$ nanoparticles are evenly dispersed on an $Al_2O_3$ support. The decomposition of the $CeO_2$ precursor is accelerated by changing experimental parameters of reaction between organic materials and oxygen, so as to control the size and microstructure of powder, thereby achieving the (Continued)

preparation and even dispersion of cerium oxide nanoparticles, and avoiding the problem of generation of toxic waste liquor during reaction. The method of the present invention is simple, has a short preparation period, and the cerium oxide nanoparticles prepared are evenly dispersed, can be used as catalytic materials and functional materials, and have a broad application prospect in multiple fields.

9 Claims, 1 Drawing Sheet

(51) Int. Cl.
*B01J 35/00* (2006.01)
*B01J 35/02* (2006.01)
*B01J 37/02* (2006.01)

(52) U.S. Cl.
CPC ............ *B01J 37/0238* (2013.01); *B01J 21/04* (2013.01); *B01J 35/023* (2013.01); *B01J 37/0223* (2013.01)

(56) References Cited

U.S. PATENT DOCUMENTS

| | | | | |
|---|---|---|---|---|
| 6,730,523 | B2* | 5/2004 | Hintermaier | C23C 16/40 438/3 |
| 7,285,685 | B2* | 10/2007 | Walsdorff | B01J 23/626 568/343 |
| 7,670,987 | B2* | 3/2010 | Kawashima | B01J 23/6562 423/651 |
| 9,039,836 | B2* | 5/2015 | Donet | B01J 23/42 118/716 |
| 9,126,846 | B2* | 9/2015 | Nagao | B82Y 30/00 |
| 9,511,352 | B2* | 12/2016 | Qi | B01J 21/04 |
| 9,700,877 | B2* | 7/2017 | Kim | B01J 35/026 |
| 2014/0087937 | A1 | 3/2014 | Liu | |
| 2014/0329671 | A1* | 11/2014 | Kim | H01M 4/9041 502/326 |

\* cited by examiner

PREPARATION METHOD OF ALUMINA SUPPORTED CERIUM OXIDE POWDER MATERIAL

TECHNICAL FIELD

The present invention belongs to the field of material processing engineering, and more particularly, relates to a preparation method of an alumina supported cerium oxide powder material.

BACKGROUND

As a novel functional material with excellent performances, cerium oxide ($CeO_2$) plays a key role in emerging technologies, environments and energy issues, such as the removal of nitrogen oxides in automobile exhaust; moreover, the high oxygen vacancy mobility and ion conductivity of the cerium oxide are utilized to produce electrodes of solid oxide fuel cells, and the unique electronic structure of the cerium oxide is utilized in the cosmetics industry and the glass manufacturing industry to absorb ultraviolet lights, and produce optical collection devices and optical displays, etc. The electrode electromotive force between $Ce^{3+}/Ce^{4+}$ is lower, while the $CeO_2$ material is a semi-open fluorite crystal structure, so $CeO_2$ can release $O_2$ when being under an oxygen-deficient external environment and absorb $O_2$ when being under an oxygen-enriched environment under the premise of keeping its crystal structure stable. Since the $CeO_2$ material has the ability to store and release oxygen, oxygen species in a gas phase can be transferred to a solid surface through the "respiration effect" of $CeO_2$ during a heterogeneous catalysis process, thus promoting the catalysis process. Therefore, it is of great value to study catalytic materials based on cerium oxide. Moreover, Hassanzadeh-Tabrizi et al from Tarbiat Modares University of Iran prepared an $Al_2O_3$—$CeO_2$ composite material by sintering in 2011. Researches show that compared with single $Al_2O_3$, the addition of $CeO_2$ suppresses the growth of $Al_2O_3$ crystal grains, and increases 28% fracture toughness and 17% flexural strength, which shows that $CeO_2$ also has preferable application prospect in the aspect of improving the mechanical property of $Al_2O_3$ (*Journal of the American Ceramic Society*, 2011, 94(10), P3488-3493).

A method of dispersing $CeO_2$ nanoparticles on ceramic supports is considered to be a method for effectively improving the oxygen capacity of $CeO_2$, and increasing the sintering properties and the mechanical properties of the ceramic composite material. Common dispersion methods include: ball milling, impregnation, and sol-gel, which are time consuming and often result in poor dispersion effect or production of toxic liquid wastes. In 2014, Pournajaf et al from Islamic Azad University of Iran synthesized $Al_2O_3$—$CeO_2$ nano composite material powder by a reverse microemulsion method which adjusts the size and shape of the powder by changing the surface activities of sodium dodecyl sulfate, hexadecyltrimethylammonium bromide and polyoxyethylene dodecyl ether, but may also result in the problems of time-consuming and environmental pollution. On the other hand, the effects of a precursor and a solution for the synthesis of $CeO_2$ are very complicated; therefore, the repeatability is very poor (*Ceramics International*, 2014, 40(3), P4933-4937). A chemical vapor deposition method is a relatively novel way to disperse the nanoparticles on the supports, which ensures sufficient contact between the powder and reaction gases in a rotating CVD furnace, so as to obtain evenly dispersed nanoparticles. Compared with general wet chemical method, the advantage of the chemical vapor deposition method is that no solution is used; therefore, an after-treatment process and an environmental pollution problem are avoided. The important influence factors of the chemical vapor deposition method include a precursor feeding rate, an oxygen feeding rate, a rotating speed, or the like, and the capacity and particle sizes are adjusted through the above-mentioned conditions.

SUMMARY

Object of the invention: in order to solve the technical problems existing in the prior art, the present invention aims at providing a preparation method of an alumina supported cerium oxide powder material, which is a method for supporting cerium oxide nanoparticles on the surface of alumina ceramic powder, and controls the particle size and microstructure of a composite material obtained by changing experimental parameters of a reaction between organic materials and oxygen, so as to reduce the discharge of poisonous wastes.

Technical solution: in order to realize the above-mentioned technical object, the invention provides a preparation method of an alumina supported cerium oxide powder material, which comprises the following steps of:

(1) using a cerium organometallic precursor as a $CeO_2$ material, and heating the cerium organometallic precursor in a feed vaporizer to vaporize, wherein a heating temperature range is 100 to 300° C.;

(2) pretreating $Al_2O_3$ powder by drying and sieving, and then placing the pretreated $Al_2O_3$ powder into a chemical vapor deposition reaction chamber, vacuumizing to 5 to 20 Pa, and preheating, wherein a preheating temperature is 500 to 800° C.;

(3) feeding mixed gas of oxygen, argon gas and vaporized $CeO_2$ material into a rotating reactor, and conducting rotary chemical vapor deposition under a high temperature to make the cerium organometallic precursor be decomposed into $CeO_2$ and deposited on the $Al_2O_3$ powder;

(4) after completing the reaction, stopping the rotation of the reaction chamber, closing a valve, cooling to a room temperature, and removing the coated powder; and (5) grinding and sieving the powder obtained by step (4).

Preferably, in step (1), the cerium organometallic precursor is any one of $Ce(DPM)_4$, cerium isooctanoate, $Ce(C_5H_5)_3$, and cerium acetate.

In step (2), the average particle size of the $Al_2O_3$ powder is 0.1 to 100 μm, and the purity of the powder is no less than 95%.

In step (2), the temperature rise rate of the preheating process is 2 to 10° C./min.

In step (3), the condition of the rotary chemical vapor deposition is that: a reaction temperature is 600 to 800° C., the rotating speed of the chemical vapor deposition reaction chamber is 20 to 60 rpm, and a thermal insulation reaction is conducted for 0.5 to 4 h, wherein the gas flow of argon gas is 80 to 100 sccm, and the gas flow of oxygen is 10 to 100 sccm.

The total pressure of the fed mixed gas of oxygen and argon gas is 200 to 1000 Pa, wherein the partial pressure of oxygen is 50 to 200 Pa.

In step (2), the temperature of pretreating the $Al_2O_3$ powder by drying is 80 to 100° C., the size of a sieve pore for sieving the powder is 50 to 200 meshes, and the powder is sieved by three times.

In step (5), the size of a sieve pore for sieving the powder is 50 to 200 meshes, and the powder is sieved by three times.

An alumina supported cerium oxide powder material prepared using the foregoing preparation method is also in the scope of protection of the present invention.

Beneficial effects: the rotary chemical vapor deposition technology is used in the present invention to directly deposit the $CeO_2$ nanoparticles on the $Al_2O_3$ support to synthesize the $CeO_2$—$Al_2O_3$ composite material. The particle size and dispersion of the composite material obtained are controlled by changing the experimental parameters of the reaction between the organic materials and oxygen, so that $CeO_2$ is evenly dispersed on the $Al_2O_3$ support, which greatly improves the capacity factor of materials and the reliability of products, has a short preparation period, and no solution is used in the preparation method; in this way, the processing problem of waste liquor is avoided; moreover, the method is environment-friendly, and remarkably reduces the production cost, thus having excellent industrial prospect.

DETAILED DESCRIPTION

Figure 1:
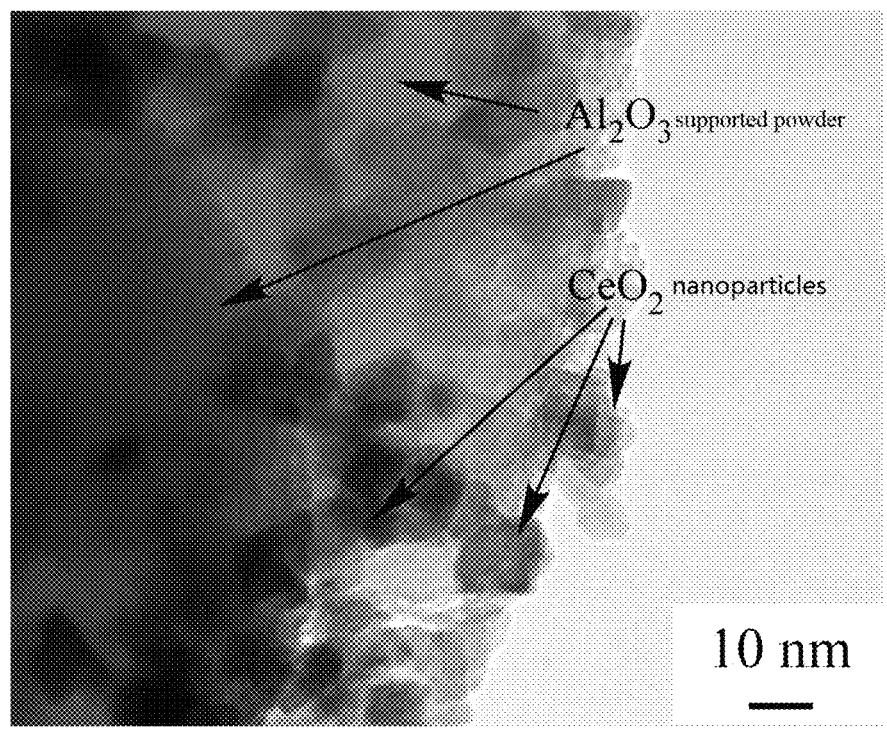
FIG. 1 is a transmission electron microscope of $CeO_2$ nanoparticles obtained under experimental parameters according to embodiment 3.

The following are merely preferred embodiments of the invention, which are intended to be illustrative of the invention only, rather than to limit the invention, and improvements made from this description shall all fall within the scope of protection as defined by the appended claims of the invention.

Embodiment 1

The present invention provides a preparation method of an alumina supported cerium oxide powder material, comprising the following steps of:

(1) using 1 g $Ce(DPM)_4$ as an organic material and heating the material in an vaporizer to 250° C.;

(2) drying 5 g $Al_2O_3$ powder (the average particle size of the $Al_2O_3$ powder was 100 μm, and the purity of the powder was no less than 95%) for 2 h under 80° C., then placing the treated $Al_2O_3$ powder into a chemical vapor deposition reaction chamber, vacuumizing to 7 Pa, and warming up to 500° C. with a preheating temperature rise rate of 10° C./min;

(3) feeding mixed gas of oxygen, argon gas and vaporized materials into a rotating reactor, wherein the gas flow of argon gas was 100 sccm, and the gas flow of oxygen was 10 sccm, then adjusting the pressure in the reaction chamber, wherein the total pressure was 200 Pa, and the partial pressure of oxygen was 50 Pa; during coating, the temperature was 600° C., the rotating speed of the reactor was 45 rpm, and thermal insulation was conducted for 0.5 h, so that $Ce(DPM)_4$ was decomposed and deposited on the $Al_2O_3$ powder;

(4) after completing the reaction, stopping the rotation of the reaction chamber, closing a valve, cooling to a room temperature, and removing the coated powder; and (5) grinding and sieving the powder obtained by step (4).

The removed $CeO_2$—$Al_2O_3$ composite material was weighed, and analyzed and viewed by means of X ray diffraction, transmission electron microscope and energy spectrum, etc. The content by weight of $CeO_2$ in the composite powder obtained was 0.5 wt %, the average particle size of $CeO_2$ was 8 nm, and $CeO_2$ was evenly distributed.

Embodiment 2

The present invention provides a preparation method of an alumina supported cerium oxide powder material, comprising the following steps of:

(1) using 3 g $Ce(DPM)_4$ as an organic material and heating the material in an vaporizer to 100° C.;

(2) drying 5 g $Al_2O_3$ powder (the average particle size of the $Al_2O_3$ powder was 50 μm, and the purity of the powder was no less than 95%) for 2 h under 80° C., then placing the treated $Al_2O_3$ powder into a chemical vapor deposition reaction chamber, vacuumizing to 5 Pa, and warming up to 600° C. with a preheating temperature rise rate of 2° C./min;

(3) feeding mixed gas of oxygen, argon gas and vaporized materials into a rotating reactor, wherein the gas flow of argon gas was 100 sccm, and the gas flow of oxygen was 10 sccm, then adjusting the pressure in the reaction chamber, wherein the total pressure was 500 Pa, and the partial pressure of oxygen was 100 Pa; during coating, the temperature was 600° C., the rotating speed of the reactor was 45 rpm, and thermal insulation was conducted for 1 h, so that $Ce(DPM)_4$ was decomposed and deposited on the $Al_2O_3$ powder;

(4) after completing the reaction, stopping the rotation of the reaction chamber, closing a valve, cooling to a room temperature, and removing the coated powder; and (5) grinding and sieving the powder obtained by step (4).

The removed $CeO_2$—$Al_2O_3$ composite material was weighed, and analyzed and viewed by means of X ray diffraction, transmission electron microscope and energy spectrum, etc. The content by weight of $CeO_2$ in the composite powder obtained was 1.2 wt %, the average particle size of $CeO_2$ was 6 nm, and $CeO_2$ was evenly distributed.

Embodiment 3

The present invention provides a preparation method of an alumina supported cerium oxide powder material, comprising the following steps of:

(1) using 10 g $Ce(DPM)_4$ as an organic material and heating the material in an vaporizer to 100° C.;

(2) drying 5 g $Al_2O_3$ powder (the average particle size of the $Al_2O_3$ powder is 10 μm, and the purity of the powder is no less than 95%) for 2 h under 80° C., pretreating the powder by a 100-mesh sieve for three times, then placing the treated $Al_2O_3$ powder into a chemical vapor deposition reaction chamber, vacuumizing to 5 Pa, and warming up to 600° C. with a preheating temperature rise rate of 5° C./min;

(3) feeding mixed gas of oxygen, argon gas and vaporized materials into a rotating reactor, wherein the gas flow of argon gas was 100 sccm, and the gas flow of oxygen was 10 sccm, then adjusting the pressure in the reaction chamber, wherein the total pressure was 1000 Pa, and the partial pressure of oxygen was 300 Pa; during coating, the temperature was 800° C., the rotating speed of the reactor was 45 rpm, and thermal insulation was conducted for 2 h, so that $Ce(DPM)_4$ was decomposed and deposited on the $Al_2O_3$ powder;

(4) after completing the reaction, stopping the rotation of the reaction chamber, closing a valve, cooling to a room temperature, and removing the coated powder; and (5) grinding and sieving the powder obtained by step (4).

Figure 2:
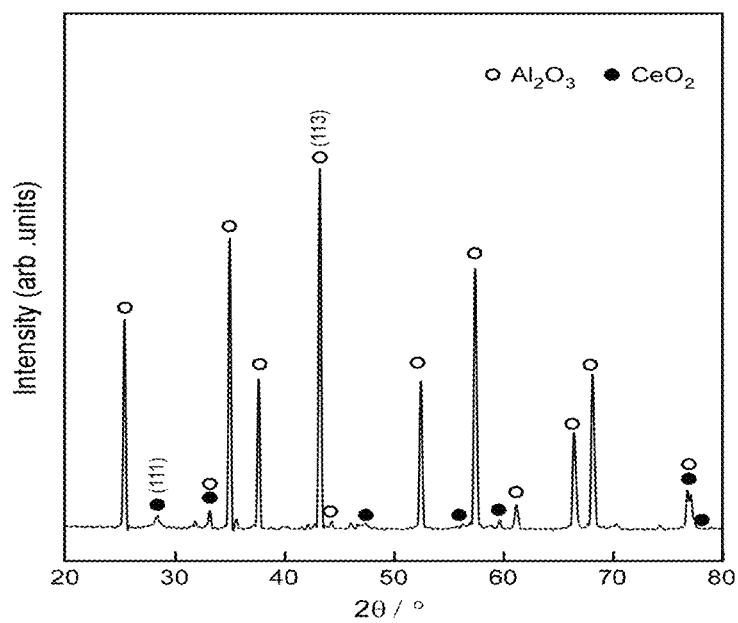
FIG. 2 is an X ray diffraction pattern of a composite powder material obtained under the experimental parameters according to the embodiment 3.

The removed $CeO_2$—$Al_2O_3$ composite material was weighed, and analyzed and viewed by means of X ray diffraction, transmission electron microscope and energy spectrum, etc. The results are shown in FIG. 1 and FIG. 2, where FIG. 1 is a transmission electron microscope of $CeO_2$ nanoparticles; and FIG. 2 is an X ray diffraction pattern of the composite powder material obtained. The content by weight of $CeO_2$ in the composite powder obtained was 5.2 wt %, the average particle size of $CeO_2$ was 13 nm, and $CeO_2$ was evenly distributed.

Embodiment 4

The present invention provides a preparation method of an alumina supported cerium oxide powder material, comprising the following steps of:

(1) using 10 g $Ce(DPM)_4$ as an organic material and heating the material in a vaporizer to 300° C.;

drying 5 g $Al_2O_3$ powder (the average particle size of the $Al_2O_3$ powder is 1 μm, and the purity of the powder is no less than 95%) for 2 h under 80° C., pretreating the powder by a 200-mesh sieve for three times, then placing the treated $Al_2O_3$ powder into a chemical vapor deposition reaction chamber, vacuumizing to 10 Pa, and warming up to 700° C. with a preheating temperature rise rate of 5° C./min;

(3) feeding mixed gas of oxygen, argon gas and vaporized materials into a rotating reactor, wherein the gas flow of argon gas was 100 sccm, and the gas flow of oxygen was 10 sccm, then adjusting the pressure in the reaction chamber, wherein the total pressure was 800 Pa, and the partial pressure of oxygen was 200 Pa; during coating, the temperature was 700° C., the rotating speed of the reactor was 45 rpm, and thermal insulation was conducted for 2 h, so that $Ce(DPM)_4$ was decomposed and deposited on the $Al_2O_3$ powder;

(4) after completing the reaction, stopping the rotation of the reaction chamber, closing a valve, cooling to a room temperature, and removing the coated powder; and (5) grinding and sieving the powder obtained by step (4).

The removed $CeO_2$—$Al_2O_3$ composite material was weighed, and analyzed and viewed by means of X ray diffraction, transmission electron microscope and energy spectrum, etc. The content by weight of $CeO_2$ in the composite powder obtained was 4.5 wt %, the average particle size of $CeO_2$ was 10 nm, and $CeO_2$ was evenly distributed.

Embodiment 5

The present invention provides a preparation method of an alumina supported cerium oxide powder material, comprising the following steps of:

using 8 g $Ce(DPM)_4$ as an organic material and heating the material in an vaporizer to 200° C.;

drying 5 g $Al_2O_3$ powder (the average particle size of the $Al_2O_3$ powder is 0.1 μm, and the purity of the powder is no less than 95%) for 2 h under 80° C., pretreating the powder by a 100-mesh sieve and a 300-mesh sieve for three times, then placing the treated $Al_2O_3$ powder into a chemical vapor deposition reaction chamber, vacuumizing to 8 Pa, and warming up to 650° C. with a preheating temperature rise rate of 4° C./min;

(3) feeding mixed gas of oxygen, argon gas and vaporized materials into a rotating reactor, wherein the gas flow of argon gas was 100 sccm, and the gas flow of oxygen was 10 sccm, then adjusting the pressure in the reaction chamber, wherein the total pressure was 800 Pa, and the partial pressure of oxygen was 300 Pa; during coating, the temperature was 650° C., the rotating speed of the reactor was 45 rpm, and thermal insulation was conducted for 2 h, so that $Ce(DPM)_4$ was decomposed and deposited on the $Al_2O_3$ powder;

(4) after completing the reaction, stopping the rotation of the reaction chamber, closing a valve, cooling to a room temperature, and removing the coated powder; and (5) grinding and sieving the powder obtained by step (4).

The removed $CeO_2$—$Al_2O_3$ composite material was weighed, and analyzed and viewed by means of X ray diffraction, transmission electron microscope and energy spectrum, etc. The content by weight of $CeO_2$ in the composite powder obtained was 4.0 wt %, the average particle size of $CeO_2$ was 9 nm, and $CeO_2$ was evenly distributed.

The foregoing description of the disclosed embodiments enables those skilled in the art to make or use the present invention. Various modifications to these embodiments will be apparent to those skilled in the art, and the generic principles defined herein may be embodied in other embodiments without departing from the spirit or scope of the invention. Therefore, the invention will not to be limited to the embodiments shown herein, but is to be in conformity with the widest scope consistent with the principles and novel features disclosed herein.

The invention claimed is:

1. A method of preparing an alumina supported cerium oxide powder material, comprising:
    (1) providing a cerium organometallic precursor as a $CeO_2$ material, and heating the cerium organometallic precursor in a feed vaporizer to vaporize, wherein a heating temperature range is 100 to 300° C.;
    (2) pretreating $Al_2O_3$ powder by drying and sieving, and then placing the pretreated $Al_2O_3$ powder into a chemical vapor deposition reaction chamber, vacuumizing to 5 to 20 Pa, and preheating, wherein a preheating temperature is 500 to 800° C.;
    (3) feeding a mixed gas of oxygen and argon gas, and vaporized $CeO_2$ material into a rotating reactor, and conducting rotary chemical vapor deposition under a high temperature to make the cerium organometallic precursor be decomposed into $CeO_2$ and deposited on the $Al_2O_3$ powder;
    (4) after completing the reaction, stopping the rotation of the reaction chamber, closing a valve, cooling to a room temperature, and removing the coated powder; and
    (5) grinding and sieving the powder obtained by step (4).

2. The method according to claim 1, wherein in step (1), the cerium organometallic precursor is any one of $Ce(DPM)_4$, cerium isooctanoate, $Ce(C_5H_5)_3$, or cerium acetate.

3. The method according to claim 1, wherein in step (2), the average particle size of the $Al_2O_3$ powder is 0.1 to 100 μm, and the purity of the $Al_2O_3$ powder is no less than 95%.

4. The method according to claim 1, wherein in step (2), the temperature rise rate of the preheating process is 2 to 10° C./min.

5. The method according to claim 1, wherein in step (3), the condition of the rotary chemical vapor deposition is: a reaction temperature is 600 to 800° C., the rotating speed of the chemical vapor deposition reaction chamber is 20 to 60 rpm, and a thermal insulation reaction is conducted for 0.5 to 4 h, wherein the gas flow of argon gas is 80 to 100 sccm, and the gas flow of oxygen is 10 to 100 sccm.

6. The method according to claim 1, wherein the total pressure of the fed mixed gas of oxygen and argon gas is 200 to 1000 Pa, and the partial pressure of oxygen is 50 to 200 Pa.

7. The method according to claim 1, wherein in step (2), the temperature of pretreating the $Al_2O_3$ powder for drying is 80 to 100° C., the size of a sieve pore for sieving the $Al_2O_3$ powder is 50 to 200 meshes, and the $Al_2O_3$ powder is sieved three times.

8. The according to claim 1, wherein in step (5), the size of a sieve pore for sieving the powder is 50 to 200 meshes, and the powder is sieved three times.

9. An alumina supported cerium oxide powder material prepared by the preparation method according to claim 1, comprising $CeO_2$ nanoparticles on a surface of the $Al_2O_3$ powder; wherein:

the average particle size of the $Al_2O_3$ powder is 0.1 to 100 μm, and the purity of the $Al_2O_3$ powder is no less than 95%;

the $CeO_2$ nanoparticles have an average particle size of 6-13 nm;

the $CeO_2$ nanoparticles are evenly distributed on the surface of the $Al_2O_3$ powder; and the $CeO_2$ nanoparticles are included at 0.5-5.2 wt % of the alumina supported cerium oxide powder material.

\* \* \* \* \*